United States Patent
Lehnen et al.

(10) Patent No.: US 9,683,624 B2
(45) Date of Patent: Jun. 20, 2017

(54) CLOSURE PACKAGE FOR CLOSING A DAMPER TUBE FOR A VIBRATION DAMPER

(71) Applicant: THYSSENKRUPP BILSTEIN GMBH, Ennepetal (DE)

(72) Inventors: Andreas Lehnen, Kell am See (DE); Guido Stiller, Ennepetal (DE); Hanno Luczak, Hattingen (DE)

(73) Assignee: THYSSENKRUPP BILSTEIN GMBH, Ennepetal (DE)

( * ) Notice: Subject to any disclaimer, the term of this patent is extended or adjusted under 35 U.S.C. 154(b) by 0 days.

(21) Appl. No.: 14/647,371

(22) PCT Filed: Nov. 20, 2013

(86) PCT No.: PCT/EP2013/074232
§ 371 (c)(1),
(2) Date: May 26, 2015

(87) PCT Pub. No.: WO2014/082901
PCT Pub. Date: Jun. 5, 2014

(65) Prior Publication Data
US 2015/0316119 A1    Nov. 5, 2015

(30) Foreign Application Priority Data
Nov. 27, 2012   (DE) .......... 10 2012 111 474

(51) Int. Cl.
*F16C 33/74* (2006.01)
*F16F 9/36* (2006.01)
*F16F 9/32* (2006.01)

(52) U.S. Cl.
CPC ............ *F16F 9/362* (2013.01); *F16F 9/3242* (2013.01)

(58) Field of Classification Search
CPC ........ F16C 29/02; F16C 31/02; F16C 9/3242; F16C 9/362; F16C 9/363
(Continued)

(56) References Cited

U.S. PATENT DOCUMENTS 3,104,916 A * 9/1963 Dowling ................. F16F 9/362
                                                         188/322.17
3,227,497 A   1/1966 Heckethorn
(Continued)

FOREIGN PATENT DOCUMENTS

CN    2198451 Y    5/1995
CN    1821631 A    8/2006
(Continued)

OTHER PUBLICATIONS

German Language International Search Report for International patent application No. PCT/EP2013/074232; mailing date Apr. 25, 2014.
(Continued)

*Primary Examiner* — Phillip A Johnson
(74) *Attorney, Agent, or Firm* — thyssenkrupp North America, Inc.

(57) ABSTRACT

A closure package for closing a damper tube of a vibration damper includes a main body configured to be sealingly disposed the damper tube and through which a piston rod of the vibration damper can be sealingly guided. The main body has an opening into which a guide bushing for guiding the piston rod is inserted. At least one sealing unit is disposed in the main body and configured to seal against the piston rod. The guide bushing has a circumferential collar extending radially outwards at one end face that abuts against the sealing unit.

8 Claims, 2 Drawing Sheets

(58) Field of Classification Search
USPC .......................................................... 384/16
See application file for complete search history.

(56) References Cited

U.S. PATENT DOCUMENTS

| | | | | | |
|---|---|---|---|---|---|
| 3,307,883 | A | * | 3/1967 | Wustenhagen | F16F 9/363 188/322.17 |
| 3,791,495 | A | * | 2/1974 | Keijzer | F16F 9/362 188/322.17 |
| 3,870,381 | A | * | 3/1975 | Overkott | F16J 9/00 384/16 |
| 4,280,741 | A | * | 7/1981 | Stoll | F16C 27/063 277/565 |
| 4,832,161 | A | * | 5/1989 | Weiler | F16D 55/22655 188/73.44 |
| 6,105,739 | A | | 8/2000 | Deppert | |
| 2002/0020593 | A1 | | 2/2002 | Niaura et al. | |
| 2006/0185952 | A1 | | 8/2006 | Kojima | |
| 2008/0083324 | A1 | | 4/2008 | Ackermann et al. | |
| 2012/0063707 | A1 | * | 3/2012 | Pasino | F16F 9/36 384/16 |

FOREIGN PATENT DOCUMENTS

| | | |
|---|---|---|
| DE | 270951 A1 | 8/1989 |
| DE | 19706632 C1 | 7/1998 |
| DE | 19706633 C1 | 7/1998 |
| DE | 60008817 T2 | 8/2004 |
| DE | 102007007273 A1 | 4/2008 |
| DE | 102007005690 A1 | 8/2008 |
| DE | 102009028047 B3 | 2/2011 |
| WO | 2009/136466 A1 | 11/2009 |

OTHER PUBLICATIONS

English translation of International Search Report for International patent application No. PCT/EP2013/074232; mailing date Apr. 25, 2014.
English translation of abstract of DE 102007005690 (A1).
English language Abstract of CN2198451Y listed above.
English language Abstract of DD270951A1 listed above.
English language Abstract of DE 19707633C1 listed above.
English language Abstract of DE 102009028047B3 listed above.

* cited by examiner

CLOSURE PACKAGE FOR CLOSING A DAMPER TUBE FOR A VIBRATION DAMPER

CROSS REFERENCE TO RELATED APPLICATIONS

This application is a U.S. National Stage Entry of International Patent Application Serial Number PCT/EP2013/074232, filed Nov. 20, 2013, which claims priority to German Patent Application No. DE 102012111474.9 filed Nov. 27, 2012, the entire contents of both of which are incorporated herein by reference.

FIELD

The present disclosure relates to a closure package for closing off a damper tube of a vibration damper.

BACKGROUND

A closure package for closing off a damper tube simultaneously serves for the leadthrough of the piston rod, which is connected within the damper tube to a working piston of the vibration damper. The piston rod is guided by way of a guide bushing, and depending on the operating situation of the vibration damper, transverse forces may act on the piston rod, which transverse forces must be accommodated by the guide bushing. The damper tube is filled with a damping fluid, such that the closure package must furthermore perform the task of closing off the damper tube in liquid-tight fashion. Here, there is the problem in particular that the seal unit must be designed such that a pressure-tight closure of the damper tube is produced despite the piston rod led through the opening in the main body. Owing to the tasks that the closure package must perform, the latter is often also referred to as sealing and guiding pack.

DE 10 2007 005 690 A1 presents, for example, a closure package for closing off a damper tube of a vibration damper, and a guide bushing serves for guiding the piston rod which is inserted in a guide part of the closure package. Said document also presents a seal unit which is accommodated in a carrier part of the closure package. The main body of the closure package is thus of two-part form, necessitating a cumbersome design of the closure package.

FIG. 1 shows a cross-sectional view of a closure package 1 according to further general prior art, and the closure package 1 is held at the end side in a damper tube 10. As a main constituent of the closure package 1, the figure shows a main body 11, and in order for the main body 11 to be received in retained fashion in the damper tube 10, said main body has a circumferential groove 20 into which a pressed-in region 21 of the damper tube 10 is pressed owing to plastic deformation for example as a result of an external circumferential rolling process. This gives rise to a mechanically loadable, durable arrangement of the main body 11 in the damper tube 10. Furthermore, an O-ring seal 22 is provided between the main body 11 and the inner side of the damper tube 10, by means of which O-ring seal the interior, which is filled with damping liquid, of the damper tube 10 is closed off in pressure-tight fashion.

The piston rod 12 is guided in an axial direction 19 by way of a guide bushing 13 inserted in an opening in the main body 11, such that the piston rod 12 can perform a stroke movement in the damper tube 10. Here, the guide bushing 13 also accommodates forces acting laterally with respect to the axial direction 19. For a retained arrangement of the guide bushing 13, the latter is pressed into the opening in the main body 11, wherein permanent, secure seating of the guide bushing 13 is no longer necessarily ensured after a relatively long period of operation of the vibration damper. Depending on temperature influences and the expansion behavior of the materials involved in the event of a temperature change, the interference fit of the guide bushing 13 in the opening in the main body 11 may loosen, such that the guide bushing 13 can slip out of the opening in the main body 11 and thus be lost, resulting in total failure of the vibration damper.

Shown below the guide bushing 13 is a seal unit 14, 15, and the seal unit 14, 15 has a rod sealing element 14 and an outer sealing element 15. The rod sealing element 14 serves for contigious sealing against the piston rod 11, and annularly surrounds the latter. The outer sealing element 15 serves for the support of the rod sealing element 14, wherein the seal unit 14, 15 is held in the main body 11 of the closure package 1 by way of a closure plate 18. The closure plate 18 is in this case pressed into the receiving seat 23 in the main body 11.

The rod sealing element 14 bears, at the top side, against a sealing contact surface 11a in the main body 11. In the radially inner region of the rod sealing element 14, the lower end 13a of the guide bushing 13 comes into contact with the rod sealing element 14, and during the operation of the vibration damper, the stroke movement of the piston rod 12 along the axial direction 19 gives rise to a permanent movement of the rod sealing element 14 against the lower end 13a of the guide bushing 13. This can result in permanent damage to the rod sealing element 14, resulting in increased extrusion behavior of the pressure-loaded rod sealing element 14, and a further result is intense wear of and local damage to the surface of the rod sealing element 14. The slightly beveled lower end 13a of the guide bushing 13 is necessary, as the bevel constitutes an installation aid; furthermore, the internal bevel is required in order to improve the guidance of the piston rod 12. The intense load on the rod sealing element 14 can result in premature failure of the seal unit 14, 15, which constitutes a further disadvantage of the illustrated closure package 1 aside from the insecure arrangement of the guide bushing 13 in the main body 11.

Accordingly there is a need for a closure package for closing off a damper tube of a vibration damper that provides for an improved operational reliability and a longer service life for the vibration damper.

DETAILED DESCRIPTION

Figure 1:
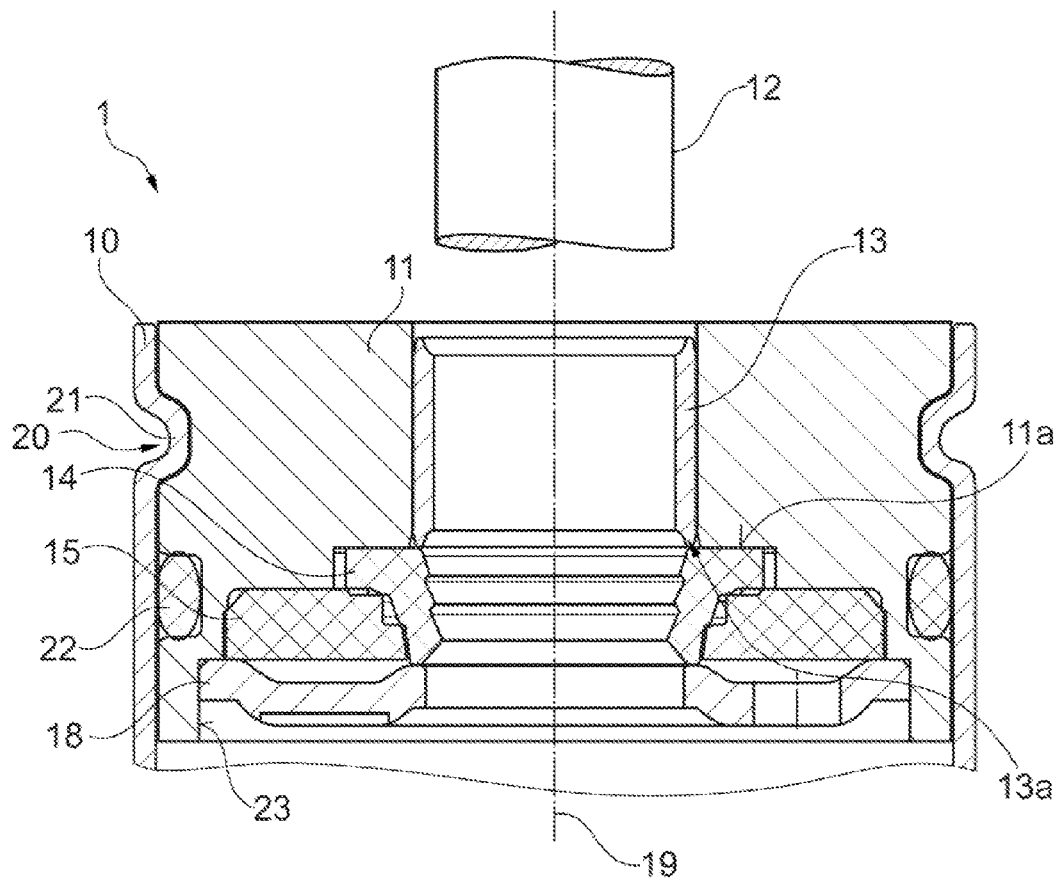
FIG. 1 is a side cross section view of a prior art closure package.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

A closure package for closing off a damper tube of a vibration damper, as disclosed herein, includes a guide bushing for guiding a piston rod therein and a seal unit for sealing contact with the piston rod.

The invention encompasses the technical teaching that the guide bushing has, on an end side, a circumferential, radially outwardly pointing collar, adjacent to which the seal unit is arranged.

By means of a radially outwardly pointing collar on the guide bushing, it is made possible for the guide bushing to be received in positively locking fashion in the main body of the closure package. It is thus achieved that the guide bushing can no longer become loosened from the main body of the closure package as a result of the operation of the vibration damper, because the positive locking of the collar of the guide bushing in the main body prevents the guide bushing from slipping out of the opening in the main body.

As a further essential advantage, the collar of the guide bushing forms an improved contact geometry for the rod sealing element of the seal unit, such that even over a relatively long period of operation of the vibration damper, damage to the rod sealing element is prevented. The collar may also be regarded as a flange on the guide bushing, wherein the inner side of the guide bushing serves for guiding the piston rod, and wherein the outer side of the guide bushing is provided for being arranged in positively locking fashion in the opening of the main body. Here, it is preferable for the collar to be situated at the end side on the guide bushing, such that the latter has for example an L-shaped circumferential bushing cross section.

In a preferred embodiment of the closure package, and in particular for the formation of the seal unit, the latter may be formed at least from a rod sealing element and an outer sealing element, wherein the rod sealing element is adjacent to a planar end surface, which forms an axial termination of the guide bushing, of the collar. Here, the outer sealing element serves for the radial and partially also axial support of the rod sealing element, wherein the rod sealing element comes into contact with the surface of the piston rod. Furthermore, the rod sealing element comes into contact, by way of a top side, with the terminating planar end surface of the collar and forms planar contact with the latter, thus no longer leading to premature failure of the rod sealing element.

For example, the main body may have a circumferential collar seat in which the collar of the guide bushing is seated, wherein, in particular, the planar contact face of the collar terminates flush with a sealing contact surface on the main body. The planar contact face of the collar thus lies in the plane of the sealing contact surface on the main body, such that despite the collar situated on the guide bushing, there is no disruptive shoulder for the contact of the rod sealing element against the main body, such that in this way, too, damage to the rod sealing element is prevented.

The guide bushing with the collar is received in positively locking fashion by virtue of the guide bushing being held captively between the collar seat in the main body and the seal unit, in particular the rod sealing element, in the axial direction of the vibration damper by way of the collar. For receiving the seal unit with the rod sealing element and the outer sealing element, a closure plate may be provided, by means of which the seal unit is held in the main body, wherein the outer seal element forms a support ring between the rod sealing element and the closure plate. For the assembly of the closure package, it is thus necessary, firstly, for the guide bushing with the collar to be inserted into the opening in the main body; the rod sealing element and the outer sealing element are subsequently arranged on the main body, and finally, the closure plate is for example pressed or calked into the receiving seat in the main body.

The guide bushing with the integrally formed collar may be formed in one piece, and may preferably be composed of a plain bearing material. Plastics materials have proven to be particularly suitable as plain bearing material, wherein a nonferrous metal, for example a bronze material, is also suitable for forming the guide bushing. Here, alignment of coefficients of thermal expansion of the guide bushing and of the main body is no longer imperatively of primary importance for realizing an interference fit of the guide bushing in the opening in the main body. Owing to the fact that the guide bushing is received in positively locking fashion in the main body, it is thus possible for the material selection for forming the guide bushing to be expanded, without the material needing to have a coefficient of expansion that corresponds to the coefficient of expansion of the material for forming the main body.

The collar may have an axial thickness which substantially corresponds to the wall thickness of the guide bushing. In particular, the guide bushing may project radially inward beyond the adjacent rod sealing element at least slightly. In particular, this serves to prevent the formation of an extrusion gap into which the rod sealing element is drawn.

The invention is also directed to a vibration damper having a damper tube which is closed off by means of a closure package, wherein the closure package has a main body which is arranged for sealing arrangement in the damper tube and through which a piston rod of the vibration damper is sealingly guided, and wherein the main body has an opening in which a guide bushing for guiding the piston rod is inserted, and wherein a seal unit for sealing contact with the piston rod is provided. Here, the guide bushing has, on an end side, a circumferential, radially outwardly pointing collar, adjacent to which the seal unit is arranged. The features and associated advantages that have been described above in conjunction with the closure package self-evidently apply equally to the vibration damper according to the invention.

FIG. 1 has already been described in conjunction with the prior art discussed in the introduction.

Figure 2:
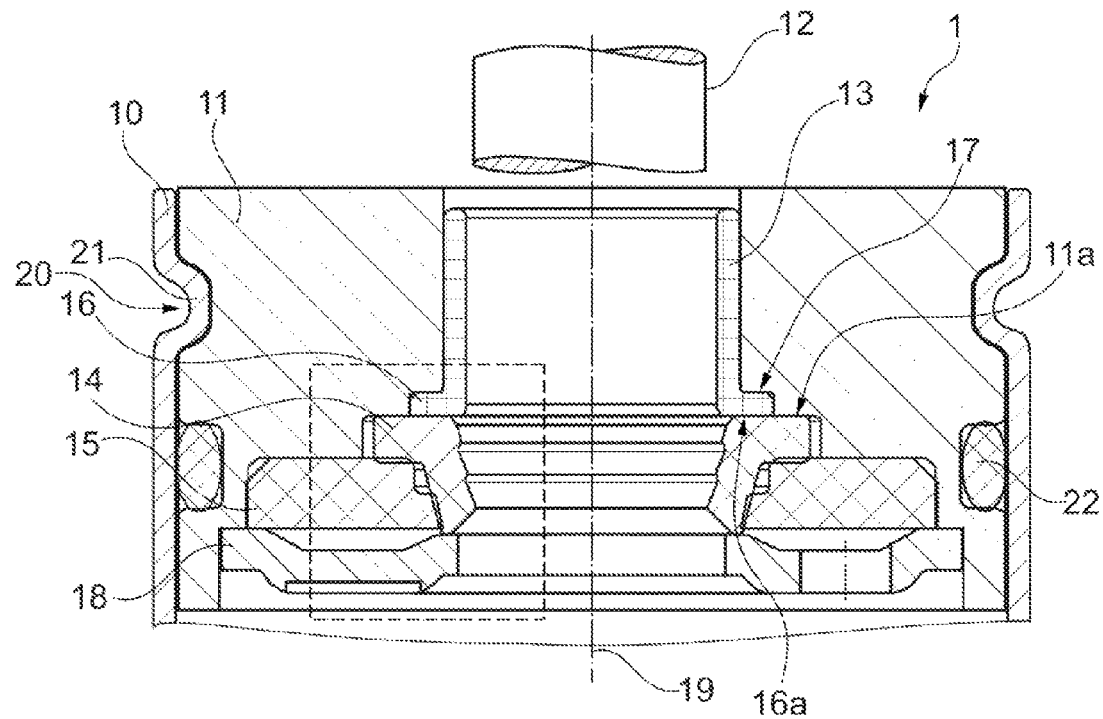
FIG. 2 is a side cross section view of a closure package with a guide bushing, as disclosed herein, for closing off a damper tube of a vibration damper.

FIG. 2 shows, in a transversely sectioned view, an exemplary embodiment of a closure package 1 for closing off, at the end side, a damper tube 10 of a vibration damper such as can be used, for example, as a constituent part of the running gear in a motor vehicle. The closure package 1 has a main body 11 which is formed for example from a metallic material. In order for the main body 11 to be arranged substantially at the end side and captively in the damper tube 10, said main body has a circumferential groove 20 into which a pressed-in region 21 of the damper tube 10 is pressed for example by way of an external circumferential rolling process. The rolling process causes a region of the damper tube 10 to be plastically deformed and pressed into the circumferential groove 20, in which the thus formed pressed-in region 21 of the damper tube 10 subsequently remains. In order for the arrangement of the main body 11 in the damper tube 10 to be made fluid-tight, an O-ring seal 22 is received in the main body 11, and the O-ring seal 22 seals off the circumferential region between the inner side of the damper tube 10 and the outer side of the main body 11.

An axially running opening is formed in the main body 11 at the inside, said opening being in the form of a bore and extending in an axial direction 19 which corresponds to the stroke direction of the piston rod 12 of the vibration damper. During operation, the piston rod 12 can move back and forth in the axial direction 19, and said piston rod must therefore be guided in sliding fashion in the main body 11 of the closure package 1. For this purpose, a guide bushing 13 is inserted in the opening in the main body 11, and the guide bushing 13, by way of the inner side thereof, guides the piston rod 12. During the operation of the vibration damper, transverse forces may act on the piston rod 12, said transverse forces being accommodated by the guide bushing 13.

To seal off the piston rod 12 that is guided through the main body 11, a seal unit 14, 15 is provided which is composed of a rod sealing element 14 and an outer sealing element 15. The rod sealing element 14 comes into direct contact with the piston rod 12 and annularly surrounds the latter, wherein the outer sealing element 15 serves for supporting the rod sealing element 14. The rod sealing element 14 and the outer sealing element 15 are formed from a highly elastic plastics material, in particular from a rubber material, and the piston rod 12 is guided through the rod sealing element 14, and thus the latter is expanded slightly.

The seal unit 14, 15 is held by way of a closure plate 18 at the bottom side in the main body 11, and the closure plate 18 is seated in a receiving seat 23 at the inside in the main body 11, and is for example pressed or calked therein. The seal unit 14, 15 and the closure plate 18 point in this case in the direction of the inner side of the damper tube 10, and are consequently seated in the main body 11 on the bottom side.

According to the invention, the guide bushing 13 has a collar 16 which extends radially outward and which forms the termination of that end of the guide bushing 13 which points in the direction of the seal unit 14, 15. The circumferential collar 16 thus forms a type of foot of the guide bushing 13 with a lower, planar end surface 16a of the collar 16, against which the rod sealing element 14 of the seal unit 14 can bear. The lower, planar end surface 16a of the collar 16 may particularly advantageously form a common plane with a sealing contact surface 11a in the main body 11, such that an outer region of the rod sealing element 14 can come into contact with the sealing contact surface 11a and an inner region of the rod sealing element 14 can come into contact with the planar end surface 16a of the collar 16, wherein the sealing contact surface 11a and the planar end surface 16a form a common circumferential planar contact face for the rod sealing element 14. In conjunction with the detail FIG. 2a, the region of the collar 16 of the guide bushing 13 seated in a collar seat 17 in the main body 11 will be described in more detail.

Figure 2A:
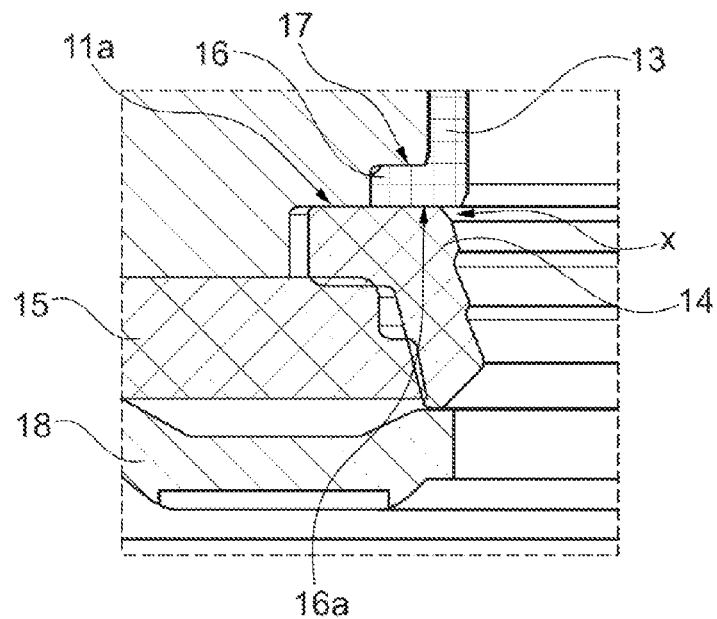
FIG. 2a is a detail view of the guide bushing of FIG. 2, showing an integrally formed collar in contact with a rod sealing element of a seal unit.

FIG. 2a shows a detail, marked in FIG. 2, of the arrangement of the collar 16 of the guide bushing 13 in the main body 11. In the main body 11 there is formed a collar seat 17 in which the collar 16 is seated. It is this that, for the first time, gives rise to the lower, planar end surface 16a of the collar 16 and the sealing contact surface 11a in the main body 11 being situated in a common plane.

The particular advantage of the collar 16 lies in the fact that the guide bushing 13 is held in positively locking fashion between the collar seat 17 in the main body 11 and the seal unit 14, 15, and cannot pass out of the opening in the main body 11 in the axial direction 19. This yields, in particular, improved freedom with regard to the material selection for the guide bushing 13 in relation to the material selection of the main body 11, and there is no need for the guide bushing 13 to be received in the opening in the main body 11 with an interference fit configured such that the guide bushing 13 must be held permanently in the opening in the main body 11 by way of the interference fit alone.

A further advantage of the collar 16 at the lower end of the guide bushing 13 arises from the fact that a transition point X is realized between the inner edge, facing toward the piston rod 12, on the rod sealing element 14 and the edge on the collar 16 of the guide bushing 13. The transition region X is in this case such that the inner side of the collar 16, which transitions into the running surface for guiding the piston rod 12 in the guide bushing 13, projects radially inward beyond the upper region of the rod sealing element 14. It is this that, for the first time, prevents material of the rod sealing element 14 from being able to be drawn by elastic deformation into the guide gap between the guide bushing 13 and the piston rod 12, which would result in destruction of the rod sealing element 14.

The invention is not restricted, in terms of its embodiment, to the preferred exemplary embodiment specified above. Rather, a number of variants are conceivable which make use of the presented solution even in fundamentally different embodiments. All of the features and/or advantages that emerge from the claims, the description or the drawings, including design details or spatial arrangements, may be essential to the invention both individually and in a wide variety of combinations.

What is claimed is:

1. A closure package for closing off a damper tube of a vibration damper, comprising:
    a main body configured to be sealingly disposed in the damper tube and having an opening defined therein through which a piston rod of the vibration damper can be sealingly guided, said opening having a sealing contact surface defined therein;
    a guide bushing disposed in said opening of said main body and configured to guide the piston rod therein, said guide bushing having a central bore defined there through and a circumferential collar disposed at a first end side thereof, which collar extends radially outward from said bushing and defines a planar end surface that forms an axial termination of said guide bushing, wherein an outer diameter of said collar is smaller than a diameter of said sealing contact surface of said main body;
    at least one seal unit disposed in said opening of said main body and configured to form a seal against an outer surface of the piston rod, said at least one seal unit comprising:
        a rod sealing element having a first end disposed against both said sealing contact surface of said main body and said collar of said guide bushing, and having an opposing second end, and defining a central bore there through, wherein an inner diameter of said central bore of said rod sealing element is larger at said first end thereof than an inner diameter of said central bore of said guide bushing at a contact interface between said guide bushing and said rod sealing element, and
        an outer sealing element disposed adjacent said rod sealing element; and
    a closure plate disposed in said opening of said main body adjacent said outer sealing element and configured to hold said seal unit in place in said main body, wherein said outer sealing element of said seal unit serves as a support ring for said closure plate and is disposed between said rod sealing element of said seal unit and said closure plate.

2. The closure package of claim 1, wherein said rod sealing element is disposed adjacent to and bears against said planar end surface of said collar of said guide bushing.

3. The closure package of claim 1 or 2, wherein said main body includes a circumferential collar seat defined therein, in which collar seat said collar of said guide bushing is seated.

4. The closure package of claim 3, wherein said guide bushing is affixed, in an axial direction of the vibration damper, between said collar seat and said seal unit, by way of said collar of said guide bushing.

5. The closure package of claim 3, wherein said guide bushing is a single unitary piece and is made of a plastic bearing material.

6. The closure package of claim 3, wherein said guide bushing is affixed into said opening in said main body by press fit.

7. The closure package of claim 3, wherein said collar of said guide bushing has an axial thickness that is substantially the same as a wall thickness of said guide bushing.

8. A vibration damper, comprising:
- a damper tube defining a central opening there through;
- a piston rod disposed in an axially moveable manner in said damper tube; and
- a closure package affixed into an interior of said damper tube and configured to close off said opening of said damper tube, said closure package comprising:
  - a main body configured to be sealingly disposed in said damper tube and having an axial opening defined therein through which said piston rod is sealingly guided, said opening having a sealing contact surface defined therein;
  - a guide bushing disposed in said opening of said main body and configured to guide said piston rod therein, said guide bushing having a circumferential collar disposed at a first end side thereof that extends radially outward from said bushing, wherein an outer diameter of said collar is smaller than a diameter of said sealing contact surface; and
  - at least one seal unit disposed in said opening of said main body and having a first end disposed against both said sealing contact surface of said main body and said collar of said guide bushing, and having an opposing second end, said seal unit further defining a central bore there through, wherein an inner diameter of said central bore of said at least one seal unit is larger at said first end thereof than an inner diameter of said guide bushing at a contact interface between said guide bushing and said seal unit, said seal unit further being configured to form a seal against an outer surface of said piston rod.

* * * * *